United States Patent
Takano

(10) Patent No.: US 7,944,718 B2
(45) Date of Patent: May 17, 2011

(54) CIRCUIT DEVICE

(75) Inventor: Yoh Takano, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 496 days.

(21) Appl. No.: 11/863,660

(22) Filed: Sep. 28, 2007

(65) Prior Publication Data

US 2008/0080217 A1    Apr. 3, 2008

(30) Foreign Application Priority Data

Sep. 29, 2006  (JP) ................................. 2006-266977
Sep. 7, 2007   (JP) ................................. 2007-233081

(51) Int. Cl.
*H02M 3/18* (2006.01)

(52) U.S. Cl. .......................................................... 363/59

(58) Field of Classification Search ..................... 363/59, 363/60; 323/265, 268
See application file for complete search history.

(56) References Cited

U.S. PATENT DOCUMENTS

| | | | | |
|---|---|---|---|---|
| 5,612,861 | A * | 3/1997 | Zhong et al. | 363/59 |
| 7,274,577 | B2 * | 9/2007 | Utsunomiya | 363/59 |
| 7,449,866 | B2 * | 11/2008 | Kanai et al. | 323/222 |
| 2006/0256592 | A1 * | 11/2006 | Yoshida et al. | 363/59 |

FOREIGN PATENT DOCUMENTS

JP    2006-020491    1/2006

* cited by examiner

*Primary Examiner* — Adolf Berhane
(74) *Attorney, Agent, or Firm* — Fish & Richardson P.C.

(57) ABSTRACT

A circuit device includes: a first booster circuit, started by a predetermined input voltage, which converts the input voltage into a first boosted voltage higher than the input voltage; a capacitor, connected to the booster circuit, which charges the first boosted voltage; a second booster circuit, connected to the capacitor via a first switch element and started by a storage voltage in the capacitor, which converts the input voltage into a second boosted voltage higher than the first boosted voltage; and a second switch element which connects an output terminal of the second booster circuit with the capacitor. The first switch element turns on to start the second booster circuit so as to supply the storage voltage in the capacitor to the second booster circuit. After the second booster circuit has been started, the first switch element turns off to stop supplying the storage voltage. After the second booster circuit has been started, the second switch element turns on to supply the second boosted voltage to the capacitor.

3 Claims, 4 Drawing Sheets

100

CIRCUIT DEVICE

CROSS-REFERENCE TO RELATED APPLICATIONS

This application is based upon and claims the benefit of priority from the prior Japanese Patent Applications No. 2006-266977, filed on Sep. 29, 2006, and Japanese Patent Application No. 2007-233081, filed on Sep. 7, 2007, the entire contents of which are incorporated herein by reference.

BACKGROUND OF THE INVENTION

1. Field of the Invention

The present invention relates to a circuit device having a booster circuit therein.

2. Description of the Related Art

Generally, a boosting DC/DC converter is known as an apparatus for boosting a DC supply voltage from a power supply that supplies electric power, to a desired DC voltage level. In recent years, there are an increasing number of power supplies where the voltage of electric power to be supplied falls below a starting voltage of the DC/DC converter. A method was proposed where an auxiliary power supply for starting the DC/DC converter by such power supply is attached to the power supply.

FIG. 4 is a circuit diagram showing a circuit device provided with a conventional booster circuit.

This circuit device includes: a power supply 101 for supplying electric power; a first booster circuit (auxiliary power supply) 102, started by the power, which converts the power into a voltage higher than the voltage of this power; and a second booster circuit (DC/DC converter) 103, started by a first boosted power, which converts the power into a second boosted power higher than the voltage of this power and which continues the operation under this second boosted power. The circuit device further includes: a load circuit 104, operated by the second boosted power, which achieves a desired function; a capacitor 105 which charges the first boosted voltage; a voltage detection circuit 106 which detects the voltage of the capacitor 105 and outputs a voltage detection signal according to the detected voltage of this capacitor 105; and a switch element 107 controlled by the voltage detection signal. The starting voltage of the first booster circuit 102 is lower than that of the second booster circuit 103. The power charged in the capacitor 105 is supplied to the second booster circuit 103 via the switch element 107 to start the second booster circuit 103. When it is determined by the voltage detection circuit 106 that the voltage of the capacitor 105 is greater than or equal to a predetermined voltage, the switch element 107 is turned on; and the power stored in the capacitor 105 with the switch element 107 being turned off is supplied to the second booster circuit 103 to start the second booster circuit 103.

In such a conventional electronic apparatus, after the power sufficient for starting the second booster circuit 103 is charged into the capacitor 105 by the first booster circuit 102, the switch element 107 is turned on to start the second booster circuit 103 by the power stored in the capacitor 105. Once the second booster circuit 103 is started, an internal circuit is operated by itself. Thus, the switch element 107 is turned off and the supply of the voltage stored in the capacitor 105 to the second booster circuit 103 is stopped. Thereby, the power of the power supply 101 can be boosted up to the second boosted power and the electric power can be supplied to the load circuit 104 so as to operate the load circuit 104.

Though not described in the configuration of the above-mentioned conventional electronic apparatus (circuit device), an output smoothing capacitor of a large capacitance value is generally used and connected between an output terminal 127 of the second booster circuit (DC/DC converter) 103 and the load circuit 104. In recent years, the compactness and the high density are strongly desired in such electronic apparatus (circuit device). However, the size of circuit components, such as a DC/DC converter, an auxiliary power supply, a switch element and a capacitor, which constitute the electronic apparatus, places restrictions and limits the compactness and high density of the circuit device.

SUMMARY OF THE INVENTION

The present invention has been made in view of the foregoing circumstances, and a general purpose thereof is to provide a technique by which to make the size of a circuit device having a booster circuit smaller.

One embodiment of the present invention relates to a circuit device. This circuit device comprises: a first booster circuit, started by a predetermined input voltage, which converts the input voltage into a first boosted voltage higher than the input voltage; a capacitor, connected to an output terminal of the booster circuit, which charges the first boosted voltage; a second booster circuit, connected to the capacitor via a first switch element and started by a storage voltage in the capacitor, which converts the input voltage into a second boosted voltage higher than the first boosted voltage; and a second switch element which connects an output terminal of the second booster circuit with the capacitor, wherein the first switch element turns on to start the second booster circuit so as to supply the storage voltage of the capacitor to the second booster circuit; and after the second booster circuit has been started, the first switch element turns off to stop supplying the storage voltage, and wherein after the second booster circuit has been started, the second switch element turns on to supply the second boosted voltage to the capacitor.

According to this embodiment, a capacitor for charging the first boosted voltage and a capacitor for charging the second boosted voltage are put to a common use, so that two capacitors required otherwise are now a single capacitor. Thus, the size of the circuit device can be reduced and the cost thereof can be lowered.

In the above structure, the circuit device may further comprise a voltage detection circuit which detects the second boosted voltage. When the second switch element turns on after the second booster circuit has been started, the second switch element is turned off to prevent the second boosted voltage from becoming less than a predetermined reference voltage necessary for driving the second booster circuit. That is, the second switch element is turned off in order for the second boosted voltage not to be determined by the voltage detection circuit that the second boosted voltage is less than a predetermined reference voltage necessary for driving the second booster circuit at the time when the second switch element turns on after the second booster circuit has been started. According to this embodiment, when the charging in the capacitor is insufficient, namely, when the voltage stored in the capacitor is low, the state where the boosted voltage of the second booster circuit falls below the boosted voltage of the first booster circuit (drive voltage of the second booster circuit) due to a voltage drop caused thereby can be prevented. Thus, the boosting operation of the second booster circuit can be stably performed without stopping the boosting operation of the second booster circuit. When the charging in the capacitor is insufficient, namely, when the voltage stored in the capacitor is low, the second boosted voltage is charged into the capacitor, during a period from when the second switch element turns on until when it turns off, and the voltage stored in the capacitor increases slightly. The boosted voltage of the voltage-dropped second booster circuit is recovered to a predetermined voltage by a boosting operation by the second booster circuit. Thus, the voltage stored in the capacitor can be gradually raised by repeating the on and off accordingly. And when the voltage stored in the capacitor finally becomes greater than or equal to a reference voltage, the charging can be done continuously with the on-state kept. Hence, the capacitor can be stably charged by use of the second switch element without stopping the boosting operation of the second booster circuit.

Another embodiment of the present invention relates also to a circuit device. The circuit device comprises: a capacitor which contributes to a boosting operation for converting a predetermined input voltage into a boosted voltage higher then the input voltage; and a switching means for switching the capacitor to a use other than the boosting operation. In this embodiment, the use other than the boosting operation may be to smooth the boosted voltage.

It is to be noted that any arbitrary combination or rearrangement of the above-described structural components and so forth are all effective as and encompassed by the present embodiments.

Moreover, this summary of the invention does not necessarily describe all necessary features so that the invention may also be sub-combination of these described features.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE INVENTION

Figure 1:
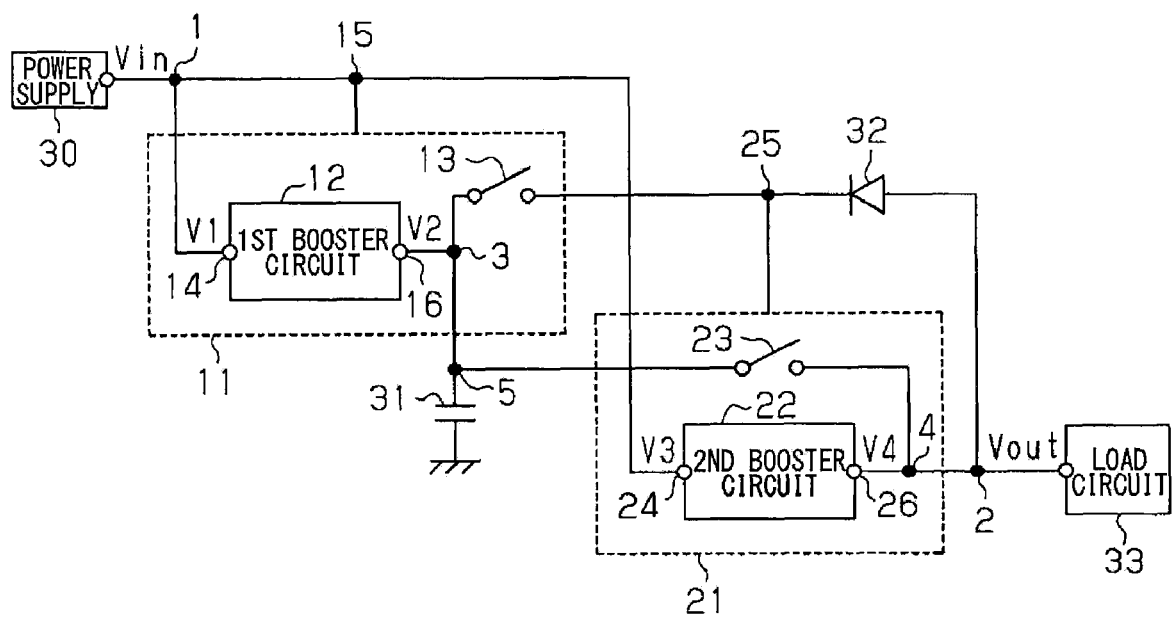
FIG. 1 is a circuit diagram of a circuit device provided with a booster circuit according to a first embodiment of the present invention.

The invention will now be described by reference to the preferred embodiments. This does not intend to limit the scope of the present invention, but to exemplify the invention.

Hereinbelow, the embodiments will be described with reference to the accompanying drawings. Note that in all of the Figures the identical components are given the identical reference numerals and the description thereof is omitted as appropriate.

First Embodiment

FIG. 1 is a circuit diagram of a circuit device provided with a booster circuit according to a first embodiment of the present invention.

The circuit device according to the first embodiment is a DC/DC converter which converts an input voltage Vin into an output voltage Vout. This circuit device is comprised of a sub power supply module 11, a main power supply module 21 and a capacitor 31.

The sub power supply module 11 includes a first booster circuit 12 and a first switch element 13. An input terminal 14 and a terminal 15 of the first booster circuit 12 are connected to a terminal 1 which is connected to a power supply 30. The power supply 30 has electric power having a predetermined input voltage Vin. At a terminal 3, an output terminal 16 of the first booster circuit 12 is connected to one electrode of the capacitor 31 and one electrode of the first switch element 13. The other electrode of the capacitor 31 is grounded (GND), whereas the other electrode of the switch element 13 is connected to a terminal 25 of a second booster circuit 22.

The main power supply module 21 includes a second booster circuit 22 and a second switch element 23. An input terminal 24 of the second booster circuit 22 is connected to the terminal 1 which is connected to the power supply 30. A terminal 25 of the second booster circuit 22 is connected to the other electrode of the switch element 13 and is connected to an output terminal 26 of the second booster circuit 22 via a terminal 2. A schottky diode 32 is provided between the terminal 25 and the terminal 26 (or the terminal 2). The terminal 26 of the second booster circuit 22 is connected to one electrode of the second switch element 23 and the terminal 2 connected to a load circuit 33 via a terminal 4. The other electrode of the second switch element 23 is connected to the one electrode of the capacitor 31 via a terminal 5.

An operation of the circuit device according to the first embodiment structured as above will now be described.

In an initial stage of start-up of the circuit device, the first switch element 13 and the second switch element 23 are both set to OFF (open-circuit state). First, a voltage lower than a starting voltage of the second booster circuit 22 is supplied from the terminal 1 connected to the power supply 30 in the sub power supply module 11, to the terminal 15. The first booster circuit 12 is started by this voltage. Then the voltage sent from the power supply 30 is converted into a first boosted voltage. As a result, the input voltage V1, which is equal to Vin, inputted to the terminal 14 of the first booster circuit 12 is outputted to the terminal 16 as an output voltage V2. Along with this, the first boosted voltage starts being charged into the capacitor 31. At this time, the first switch element 13 is turned OFF, so that the voltage across the capacitor 31 keeps rising. When the capacitor 31 reaches a predetermined voltage level or above, the first switch element 13 is switched ON (closed-circuit state). Thereby, the voltage stored in the capacitor 31 is supplied to the terminal 25 of the second booster circuit 22. With this stored voltage, the second booster circuit is started. Then the second booster circuit 22 which has been started converts the voltage sent from the power supply 30, into a second boosted voltage. As a result, an input voltage V3, which is equal to Vin, inputted to the terminal 24 of the second booster circuit 22 is outputted to the terminal 26 as an output voltage, which is equal to Vout. This second boosted voltage is supplied to the terminal 25 via the diode 32. When the second boosted voltage (output voltage V4) is stabilized and becomes greater than or equal to the starting voltage of the second booster circuit 22, an internal circuit can be operated by itself. Thus the first switch element 13 is turned off and the supply of the voltage stored in the capacitor 31 to the booster circuit 22 is stopped. Further, in accordance with the state where the first switch element 13 has been turned off, the second switch element 23 is turned on here. With such configuration and operation as described above, the capacitor 31 is connected to the terminal 26 of the second booster circuit 22, and this capacitor 31 functions as an output smoothing capacitor to the load circuit 33. As a result, the input voltage Vin of the power supply can be boosted up to the second boosted voltage (output voltage Vout) by the second booster circuit 22, and a desired voltage can be stably supplied to the load circuit 33 so as to operate the load circuit 33.

By employing the circuit device according to the first embodiment described as above, the following advantageous effect is achieved.

(1) In a circuit device capable of boosting the input voltage Vin of the power supply 30 up to the second boosted voltage (output voltage Vout) by the first booster circuit 23, started by a predetermined input voltage, which converts the input voltage into the first boosted voltage higher than the input voltage and a second booster circuit 22, started by the voltage stored in the capacitor 31 charged with the first boosted voltage, which converts the input voltage into the second boosted voltage higher than the first booster voltage, there is provided the second switch element 23 which supplies the second boosted voltage to the capacitor 31 after the second booster circuit 22 has been started. Thus the capacitor for charging the first boosted voltage in the first booster circuit 12 and the capacitor for charging the second boosted voltage in the second booster circuit 22 are put to a common use. As a result, only a single capacitor is provided as compared with two capacitors required otherwise. This helps reduce the size of circuit device and the cost thereof.

Second Embodiment

Figure 2:
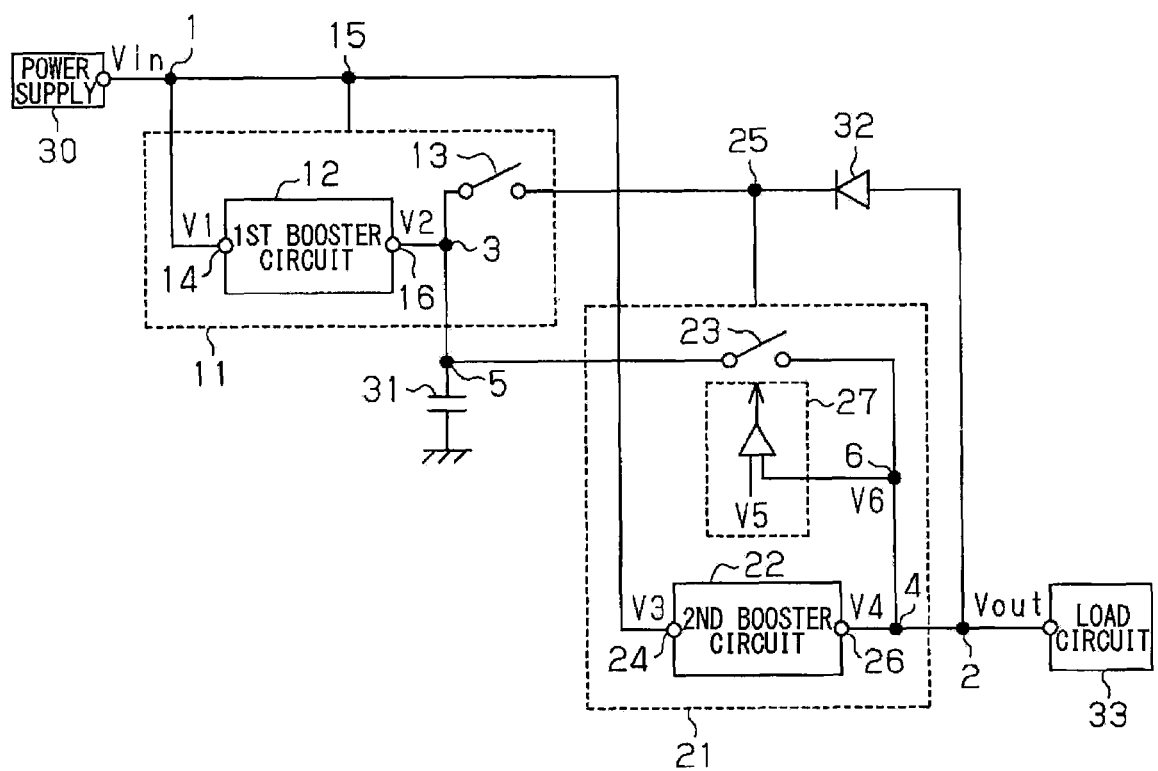
FIG. 2 is a circuit diagram showing a circuit device provided with a booster circuit according to a second embodiment of the present invention.

FIG. 2 is a circuit diagram showing a circuit device provided with a booster circuit according to a second embodiment of the present invention. A difference from the circuit device of the first embodiment is that the on-off operation of the second switch element 23 is controlled by monitoring it by a voltage detection circuit 27. Here, the voltage detection circuit 27 is a comparator. This comparator compares a reference voltage $V5(=V2+\alpha)$ and a voltage V6 of a terminal 6 provided in a terminal 26 side of a second booster circuit 22. Here, V5, or $V2+\alpha$, corresponds to an output voltage V2 of the first booster circuit 12, which is a starting voltage of the second booster circuit 22, added with a voltage variation margin $\alpha$; and V6 corresponds to an output voltage V4 of the second booster circuit 22. When the voltage V6 at the terminal 6 is greater than or equal to the reference voltage V5, the second switch element 23 is turned on (set to a closed-circuit state). When the voltage V6 at the terminal 6 is less than the reference voltage V5, the switch element 23 is switched to OFF (open-circuit state). Otherwise, the structure and operation of the second embodiment are similar to those of the first embodiment.

By employing the circuit device according to the second embodiment described as above, the following advantageous effects are achieved in addition to the above-described effect (1).

(2) When the second switch element 23 is turned on, after the start of the second booster circuit 22, and it is determined by the voltage detection circuit 27 that the output voltage V4 of the second booster circuit 22 is less than the reference voltage V5, which is the output voltage V2 of the first booster circuit 12 added with a, this second switch element 23 is turned off. As a result thereof, when the charging in a capacitor 31 is insufficient, namely, when the voltage stored in the capacitor 31 is low, the state where the output voltage V4 of the second booster circuit 22 falls below the output voltage V2 of the first booster circuit 12 due to a voltage drop caused thereby can be prevented. Thus, the boosting operation of the second booster circuit 22 can be stably performed without stopping the boosting operation of the second booster circuit 22.

(3) When the charging in the capacitor 31 is insufficient, namely, when the voltage stored in the capacitor 31 is low, the second boosted voltage is charged into the capacitor 31, during an interval from when the second switch element 23 turns on until when it turns off, and the voltage stored in the capacitor 31 increases slightly. The output voltage V4 of the voltage-dropped second booster circuit 22 is recovered to a predetermined voltage by a boosting operation by the second booster circuit 22. Thus, the voltage stored in the capacitor 31 can be gradually raised by repeating the on and off accordingly. And when the voltage stored in the capacitor 31 finally becomes greater than or equal to the reference voltage V5, the charging can be done continuously with the on-state kept. Hence, the capacitor 31 can be stably charged without stopping the boosting operation of the second booster circuit 22 by the second switch element 23.

Third Embodiment

Figure 3:
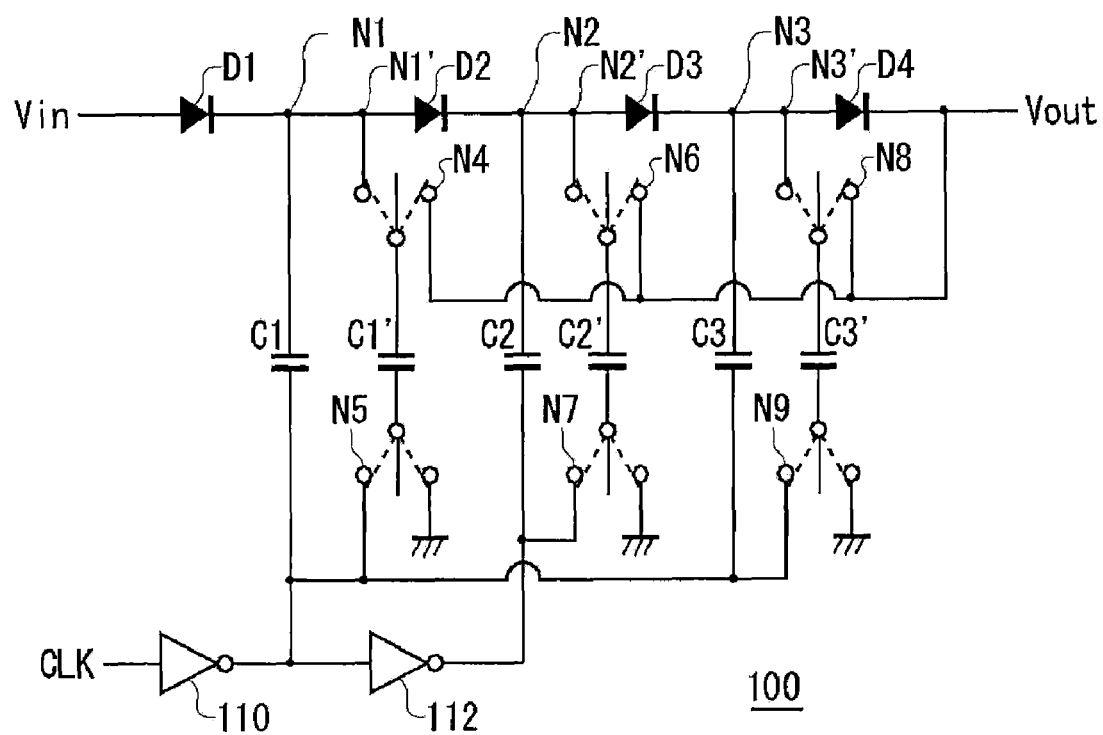
FIG. 3 is a circuit diagram of a circuit device provided with a booster circuit according to a third embodiment of the present invention.
Figure 4:
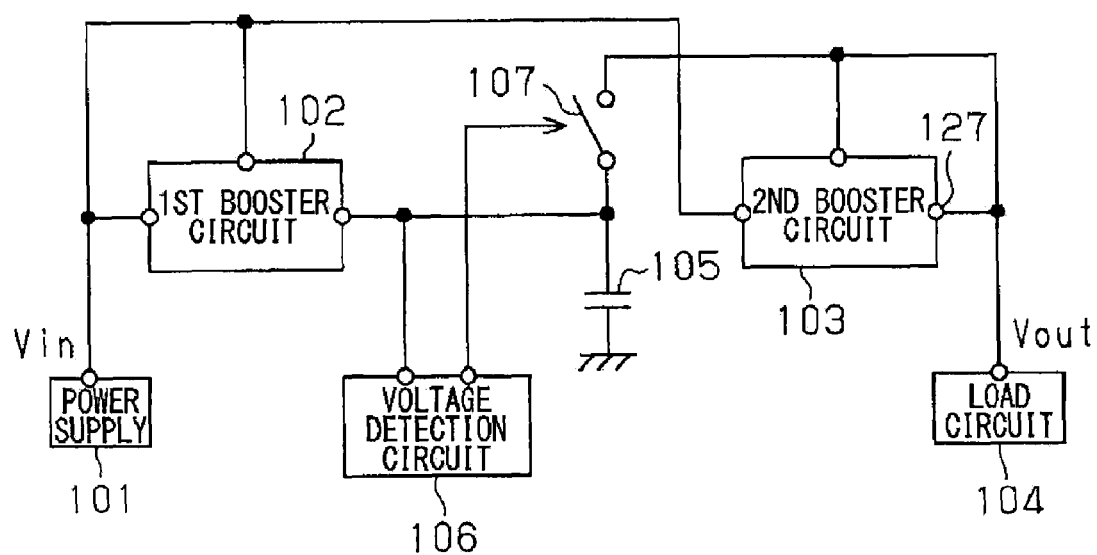
FIG. 4 is a circuit diagram of a circuit device provided with a conventional booster circuit.

FIG. 3 is a circuit diagram of a circuit device provided with a booster circuit according to a third embodiment of the present invention. The circuit device according to the third embodiment is a charge-pump circuit that converts the input voltage Vin into the output voltage Vout. A circuit device 100 is a four-stage charge-pump circuit where diodes D1 to D4 each having a threshold value Vd are connected in series in a communication channel between Vin and Vout. Capacitors C1 to C3 are connected in parallel in said communication channel. That is, the capacitor C1 is connected to a connection point N1 between the diode D1 and the diode D2. The capacitor C2 is connected to a connection point N2 between the diode D2 and the diode D3. The capacitor C3 is connected to a connection point N3 between the diode D3 and diode D4.

A clock CLK is inverted by an inverter 110 so as to become a clock CLKb whose phase is reverse to the clock CLK. This clock CLKb is applied to the capacitor C1 and the capacitor C3. Further, the clock CLKb is inverted by an inverter 112 so as to become a clock CLK. This clock CLK is applied to the capacitor C2.

Capacitors C1', C2' and C3', which are connectable in parallel with the capacitors C1, C2 and C3, respectively, are provided. More specifically, one terminal of the capacitor C1' is switchable between a connection point N1' between the diode D1 and the diode D2 and a connection point N4 connected to Vout. The other end of the capacitor C1' is switchable between a connection point N5, to which the CLK is applied, and ground. One end of the capacitor C2' is switchable between a connection point N2' between the diode D2 and the diode D3 and a connection point N6 connected to Vout. The other end of the capacitor C2' is switchable between a connection point N7, to which the CLKb is applied, and the ground. One end of the capacitor C3' is switchable between a connection point N3' between the diode D3 and the diode D4 and a connection point N8 connected to Vout. The other end of the capacitor C3' is switchable between a connection point N9, to which the CLK is applied, and the ground.

Next, an operation of the third embodiment is described. Firstly, at a start of the charge-pumping, one ends of the capacitors C1' to C3' are connected respectively to N1' to N3'. The clock CLK is applied to the other terminals of the capacitors C1' and C3', whereas the clock CLKb is applied to the other terminal of the capacitor C2'. Thereby, the capacitors C1' to C3' in addition to the capacitors C1 to C3 contribute to a pumping operation.

More concretely, when the clock CLK is at an L level (0 V), the voltage of the connection point N1 (N1') is Vin−Vd. Thereafter, when the clock CLK becomes an H level (Vin), the voltage $V_{N1}$ of the connection point N1 (N1') is 2Vin−Vd as a result of capacitive coupling assuming that the floating capacitance value of the connection point N1 (N1') is ignored.

When the clock CLK is at an H level, the clock CLKb is at an L level, so that the voltage $V_{N2}$ of the connection point N2 (N2') is 2 (Vin−Vd). Thereafter, when the clock CLKb becomes an H level, the voltage $V_{N2}$ is 3Vin−2Vd as a result of capacitive coupling assuming that the floating capacitance value of the connection point N2 (N2') is ignored.

When the clock CLKb is at an H level, the clock CLK is at an L level, so that the voltage $V_{N3}$ of the connection point N3 (N3') is 3 (Vin−Vd). Thereafter, when the clock CLK becomes an H level, the voltage $V_{N3}$ is 4Vin−3Vd as a result of capacitive coupling assuming that the floating capacitance value of the connection point N3 (N3') is ignored. If the threshold voltage Vd of the diode D4 is taken into account, Vout will be 4 (Vin−Vd) finally.

At the start of charge pumping, the capacitors C1' to C3' contributes to the pumping operation, so that Vout is generated promptly.

Next, after Vout has once risen up, one terminals of the capacitors C1' to C3' are connected respectively to the connection points N4, N6 and N8. The other terminals of the capacitors C1' to C3' are connected to the ground. Thereby, the capacitors C1' to C3' are connected in parallel with Vout and function as a smoothing capacitance.

After Vout has once risen up, it is only necessary to handle the load current, so that a small drive capability of charge pump may suffice. For the purpose of preventing a system malfunction, the variation in Vout due to noise must be restricted. As described above, the capacitors C1' to C3' function as smoothing capacitances. Hence, the drive capability necessary and sufficient for the charge-pump can be left to be used, which in turn helps smooth Vout. When a large load current flows temporarily and Vout drops drastically, the capacitors C1' to C3' are contributed to the pumping operation the same way as with the start-up. This can increase the drive capability temporarily and recover Vout at high speed.

By employing the circuit device according to the third embodiment described as above, the following advantageous effect is achieved in addition to the above-described effects.

(4) Two functions which are the pumping operation and the smoothing are achieved by switching the capacitors used for the circuit device. Thereby, the size of the circuit device can be made smaller, thus contributing to the low cost in the circuit device.

The present invention is not limited to the above-described embodiments only, and it is understood by those skilled in the art that various modifications such as changes in design may be made based on their knowledge and the embodiments added with such modifications are also within the scope of the present invention.

For example, a four-stage charge pump is exemplified in the circuit device according to the third embodiment. However, the number of capacitors, connected in parallel, which are contributed to the pumping is not limited to three, and the number of stages in the pump may be two, three, five or more.

In the first to third embodiments, the smoothing of boosted voltage is exemplified as another use of the capacitors besides the boosting operation. However, the use of the capacitors is not limited thereto.

While the preferred embodiments of the present invention have been described using specific terms, such description is for illustrative purposes only, and it is to be understood that changes and variations may be further made without departing from the spirit or scope of the appended claims.

What is claimed is:

1. A circuit device, comprising:
a first booster circuit, started by a predetermined input voltage, which converts the input voltage into a first boosted voltage higher than the input voltage;
a capacitor, connected to an output terminal of said booster circuit, which charges the first boosted voltage;
a second booster circuit, connected to said capacitor via a first switch element and started by a storage voltage in said capacitor, which converts the input voltage into a second boosted voltage higher than the first boosted voltage; and
a second switch element which connects an output terminal of said second booster circuit with said capacitor,
wherein the first switch element turns on to start said second booster circuit so as to supply the storage voltage of said capacitor to said second booster circuit; and after said second booster circuit has been started, the first switch element turns off to stop supplying the storage voltage, and
wherein after said second booster circuit has been started, said second switch element turns on to supply the second boosted voltage to said capacitor.

2. A circuit device according to claim 1, further comprising a voltage detection circuit which detects the second boosted voltage,
wherein when it is determined by said voltage detection circuit that the second boosted voltage is less than a predetermined reference voltage necessary for driving said second booster circuit at the time when said second switch element turns on after said second booster circuit has been started, said second switching element is turned off.

3. A circuit device according to claim 1, wherein the capacitor is used to charge the first boosted voltage before the second booster circuit is started, and is used, after the second booster circuit is started, to smooth the output voltage of the second booster circuit that should be supplied to a load.

* * * * *